United States Patent [19]

Meier et al.

[11] Patent Number: 5,513,309

[45] Date of Patent: Apr. 30, 1996

[54] GRAPHIC EDITOR USER INTERFACE FOR A POINTER-BASED COMPUTER SYSTEM

[75] Inventors: John R. Meier, Cupertino; Stephen P. Capps, San Carlos, both of Calif.

[73] Assignee: Apple Computer, Inc., Cupertino, Calif.

[21] Appl. No.: 436,082

[22] Filed: May 8, 1995

Related U.S. Application Data

[63] Continuation of Ser. No. 1,120, Jan. 5, 1993, abandoned.

[51] Int. Cl.$^6$ .............................. G06F 3/00; G06F 3/033; G06T 3/00
[52] U.S. Cl. .................... 395/155; 395/136; 395/138; 395/146; 345/179
[58] Field of Search ........................... 395/161, 159, 395/155, 136, 138, 139, 146, 147, 134; 345/121, 127, 131, 145, 179

[56] References Cited

U.S. PATENT DOCUMENTS

| | | | |
|---|---|---|---|
| 4,683,468 | 7/1987 | Himelstein et al. | 345/145 X |
| 4,703,321 | 10/1987 | Barker et al. | 345/121 |
| 4,745,405 | 5/1988 | Himelstein et al. | 345/145 |
| 5,001,697 | 3/1991 | Torres | 395/139 |
| 5,262,760 | 11/1993 | Iwamura et al. | 345/145 |
| 5,299,307 | 3/1994 | Young | 395/161 |
| 5,396,590 | 3/1995 | Kreegar | 395/159 |
| 5,428,721 | 6/1995 | Sato et al. | 395/136 X |

OTHER PUBLICATIONS

Mack et al., "A Comparison of Touch and Mouse Interaction Techniques for a Graphical Windowing Softwave Environment", Proceedings of the Human Factors Society 35th Annual Meeting, Sep. 1991, pp. 286–289.

MacDraw Pro User's Guide, Claris Corporation, 1991, pp. (3–5)–(3–15), (3–18)–(3–21), (3–40)–(3–41), (3–43)–(3–46), (3–52)–(3–59).

Microsoft Windows User's Guide, Version 3.0, Microsoft Corporation, 1990, pp. 232–234, 296–303.

O'Connor, Rory J., "Apple banking on Newton's brain," San Jose Mercury News, Apr. 22, 1992.

Weiman et al., "A Step Toward the Future" Macword, Aug. 1992, pp. 129–131.

M. Soviero, "Your World According to Newton" Popular Science, Sep. 1992, pp. 45–49.

F. Abatemarco, "From the Editor" Polular Science, Sep. 1992, p. 4.

Macintosh User's Guide, Apple Computer Inc. 1991, pp. 47–50.

*Primary Examiner*—Raymond J. Bayerl
*Attorney, Agent, or Firm*—Hickman Beyer & Weaver .

[57] ABSTRACT

A graphical editor user interface that is particularly well suited for use in pointer based computer systems. The graphical editor is arranged to permit the user to easily edit various selected graphic objects. The selected objects are highlighted and preferably editing handles are provided at designated positions relative to the selected portions of the object. Additionally, a bounding box is drawn about the selected portions of the object. In various aspects of the invention, the user is then permitted to edit the object by executing specific actions. The editing actions include resizing, duplicating, distorting and moving either the entire object or only the selected portions. After any of the editing maneuvers is performed, the display is updated to reflect any changes made during the editing step. The editing and display updating steps are preferably continually repeated until the pointer is released from the screen in order to provide the user with a visual depiction of the editing operation as it proceeds.

6 Claims, 12 Drawing Sheets

GRAPHIC EDITOR USER INTERFACE FOR A POINTER-BASED COMPUTER SYSTEM

This is a continuation of application Ser. No. 08/001,120, filed Jan. 5, 1993, now abandoned.

BACKGROUND OF THE INVENTION

The present invention relates generally to editing graphics in a pointer based computer system. More particularly, a graphics editor user interface is described.

The use and popularity of pointer based computer systems, including pen-based, stylus-based, track ball, and mouse driven systems has been increasing dramatically in recent years. This increased popularity is typically attributed to the ease of use of such machines, when compared to traditional computing systems that utilize only a keyboard as an input device.

A pen-based computer system is a small, often hand held, computer system in which the primary method for inputting data includes a stylus or "pen". A typical pen-based computer system is housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of the stylus on the viewing screen and provides positional information to the computer's central processing unit (CPU). Some display assemblies can also sense the pressure of the stylus on the screen to provide further information to the CPU. When operating as an output device, the display assembly presents computer-generated images on the screen.

The dual-function display assembly of a pen-based computer system permits users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen. With suitable recognition software, text and numeric information can also be entered into the penbased computer system in a similar fashion.

Besides serving as a notepad, pen-based computers can provide a number of useful functions, such as serving as an address book, an appointment calendar, a to-do list, etc. These functions can be tightly integrated with the operating system of the computer, permitting information input into one function to impact upon another function.

Users of pointer and pen based computer systems often want to be able to edit graphical objects that are displayed on the screen. It is therefore desirable that a readily usable user interface be provided to facilitate the editing of graphics.

SUMMARY OF THE INVENTION

Accordingly, it is an object of the present invention to provide a graphical editor user interface which is particularly well suited for use in pointer based computer systems.

To achieve the foregoing and other objects and in accordance with the purpose of the present invention, a method for editing objects displayed on the screen of a display assembly of a pointer based computer system is described.

In its general aspects, the method includes the step of selecting at least a portion of an object to be edited. This selected portion is then highlighted and preferably editing handles are provided at designated positions relative to the selected portions of the object. Additionally, a bounding box is drawn about the selected portions of the object. In various aspects of the invention, the user is then permitted to edit the object by executing specific actions.

In one aspect of the invention the user may resize the selected portion of the object during the editing step. Resizing occurs when the user places the pointer on the perimeter of the bounding box and drags the pointer across the screen. This action causes the selected portion of the object to be resized as a function of the movements of the pointer across the screen.

In another aspect of the invention, the user may move the object during the editing step. Moving occurs when the user places the pointer within the bounding box at a location that is not substantially directly over either the bounding box or any selected portion of the object and then drags the pointer across the screen. This action causes the entire object to move as a function of the movements of the pointer across the screen.

In another aspect of the invention, the user may distort the object during the editing step. Distortion occurs when the user places the pointer on one of the editing handles and drags the pointer across the screen. This action causes the object to be distorted as a function of the movements of the pointer across the screen.

In still another aspect of the invention, the user may move the selected portion of the object independent of any non-selected portions of the object. Selected portion moving occurs when the user places the pointer on the selected portion of the object at a location that is not substantially directly over an editing handle and then drags the pointer across the screen. This action causes the selected portion of the object to be moved as a function of the movements of the pointer across the screen.

In yet another aspect of the invention, the user is permitted to duplicate the selected portion of the object by tapping on the screen at a location that is within the bounding box.

After any one of the editing maneuvers is performed, the display is updated to reflect any changes made during the editing step. When a duplication operation is performed, the duplicate of the selected portion of the object is displayed at a position that is offset from the position of the original selected portion of the object in the display updating step. The described editing and display updating steps are preferably continually repeated until the pointer is released from the screen in order to provide the user with a visual depiction of the editing operation as it proceeds.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

The present invention is particularly well suited for pointer based computer systems such as the pen-based, stylus-based and mouse-based systems that are currently popular. For the purposes of illustration, the invention will be described in connection with a pen-based system.

Figure 1:
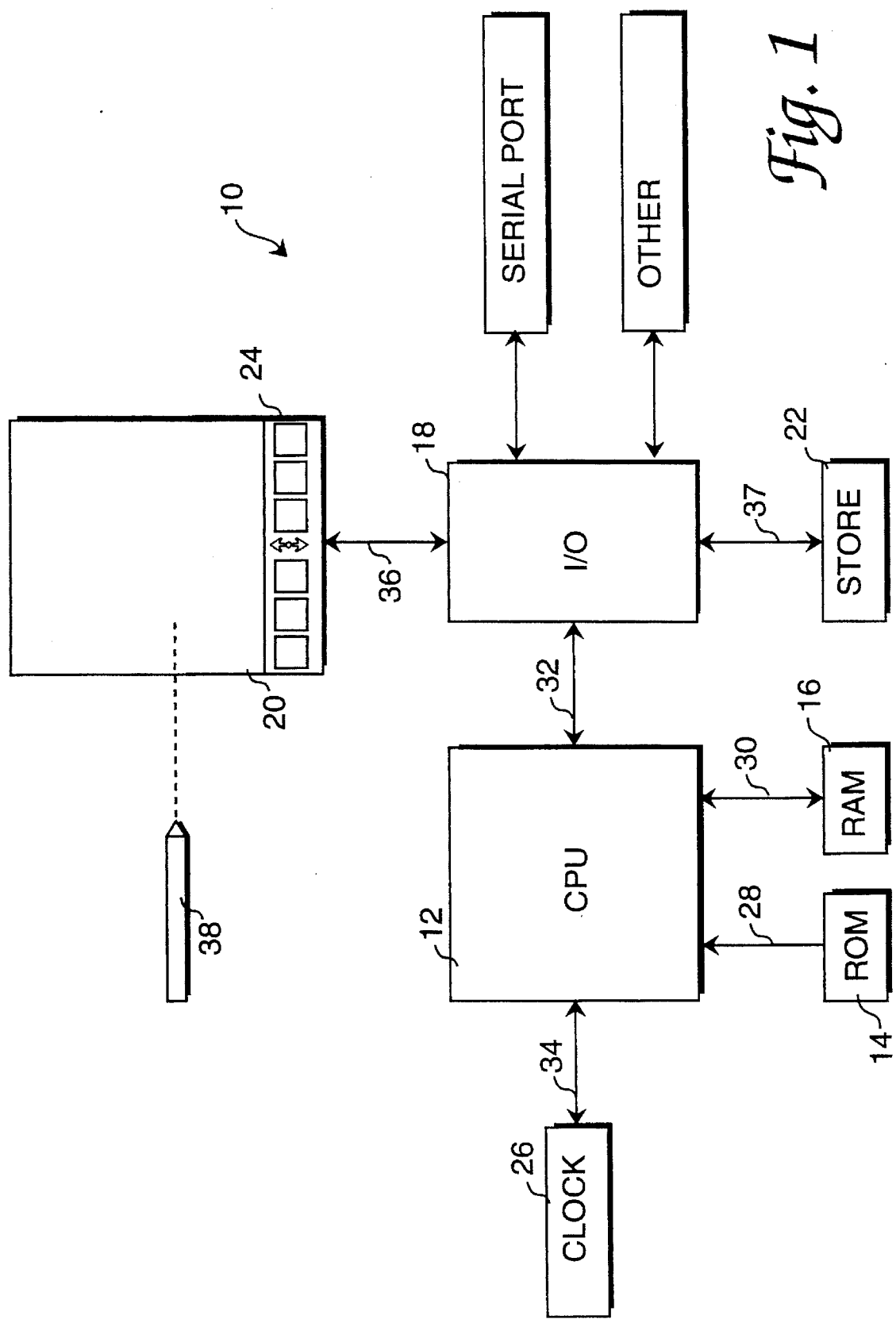
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24 arranged as an array of input buttons, a serial port, another I/O port and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bidirectional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bidirectional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, the keypad 24, a serial port and an I/O port. Keypad 24, the serial port, and the I/O port are each coupled to the I/O circuitry 18 by a suitable data bus.

Clock 26 provides a series of clock pulses and is typically coupled to an interrupt port of CPU 12 by the data line 34. The clock pulses are used to time various functions and events relating to the computer system 10. The clock 26 can be eliminated and the clock function replace by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array of switches. In the present embodiment, the keypad 24 comprises mechanical buttons which overlie the bottom edge of the membrane which covers the LCD display. When the buttons are depressed, the membrane senses the pressure and communicates that fact to the CPU 12 via I/O circuitry 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, or nonvolatile memory such as flash memory or battery backed RAM, PC-data cards or the like.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. X & Y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

The aforementioned process produces the illusion that the stylus 38 has an "ink" which appears on the screen of the display assembly 20. Therefore, as used herein, the terms "inking" and "ink" will refer to the process and the result, respectively, of displaying a line or other indicia on the screen of display assembly 20 in response to the movement of stylus 38 on the screen.

Figure 2:
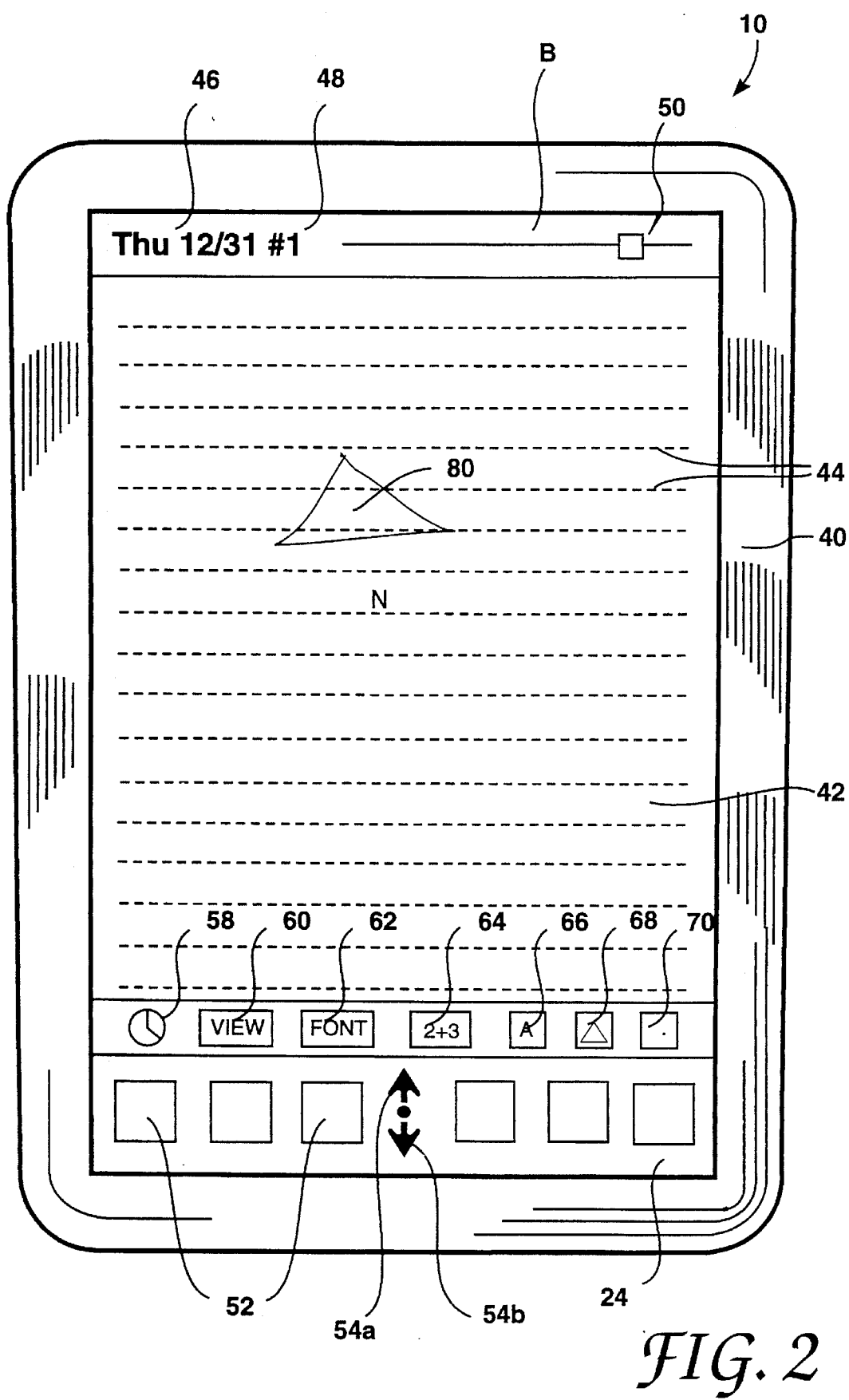
FIG. 2 is a top plan view of the screen, case and keypad of the computer system of FIG. 1 with a graphical object being displayed on the screen.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a breaker bar B and a number of guidelines 44. The breaker bar B preferably includes the date of creation 46 of the note N, a note number 48 and a "router" button 50 which allows notes to be dispatched to a printer, facsimile, the trash, etc. The optional guidelines 44 aid a user in entering text, graphics, and data into the pen-based computer system 10. The screen of FIG. 2 is shown displaying a graphic depiction of an arrow.

In this preferred embodiment, the keypad 24 is not a part of the screen 42 but rather, is a permanent array of input buttons coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52, a pair of scroll buttons 54A, 54B and center button 55. The operation of the scroll buttons 54A and 54B, and other aspects of computer system 10 are discussed in greater detail in U.S. Pat. No. 5,398,310 to Tchao et al. and entitled "Method for Manipulating Notes on a Computer Display". That patent is assigned to the assignee of the present application and its disclosure is hereby incorporated by reference in its entirety. The function buttons 52 include an address button 63, a calendar button 64, a drawer button 65, a find button 66, an undo button 67, and an assist button 68.

As described in the above referenced patent to Tchao et al., in one suitable embodiment of the present invention, a notepad application program is launched when the computer system 10 is turned on. The address button 63 can then be used to launch an address book application program. That is, when the address button 63 is depressed, a suitable address book application program is opened and a suitable address book dialog box is displayed on screen 42. Similarly, the calendar button 64 launches a calendar application program when depressed.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, runs within a widow, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 57, a view button 58, a font button 59, a formulas button 60, a text button 61, a graphics button 62, and a nib button 70. Co-pending application Ser. No. 07/976,970, filed Nov. 16, 1992 on behalf of Foster et al., entitled "Status Bar for Application Windows" and assigned to the assignee of the present invention describes the operation of the status bar, and is hereby incorporated herein by reference in its entirety.

The "Find" button 66 is used to initiate a search for information. The undo button 67 will undo the latest user action when depressed and will redo the action if depressed a second time without the intervention of any additional user actions. The assist button 68 gives the user access to a help menu which is designed to provide operating instructions to the user that may be helpful when the user is unsure of how to operate the computing system.

A "drawer", which is opened by pressing the drawer button 65 is used to store other application programs, tools, access buttons to external ROM cards, communications applications and other items that can be utilized by the user. When the drawer is "opened", a drawer dialog box is displayed on the screen 42. When the dialog box is opened, the user can than launch any application stored therein merely by tapping on the associated icon that is displayed within the drawer dialog box. Thus, the drawer may serve as a receptacle for various graphics applications programs and the icons serve as "soft buttons" which may be activated by tapping the screen at a location corresponding to the displayed position of the icon. Of course, in alternative embodiments, the applications that are accessed by keypad buttons can be varied widely. For example, additional keys could be added, existing keys removed, and/or the above described keys could be used to launch different applications.

It is noted that within this application reference will often be made to "tapping", "clicking on", "pressing" or otherwise selecting an object. These words are intended to interchangeably refer to the act of selecting the object. The term tapping is generally used in reference to the physical act of touching the stylus of a pen-based computing system to the screen and shortly thereafter lifting the stylus from the screen (i.e. within a predetermined period of time) without moving the stylus any significant amount (i.e. less than a predetermined amount, as for example two pixels). This is a typical method of selecting objects in a pen-based computing system. The term "clicking on" is intended to be broader in scope and is intended to cover not only tapping, but also the action of selecting an object using a button associated with a mouse or track ball as well as the selection of an object using my other pointer device.

When a line that forms a portion of a graphic object is created, it is typically stored in a compact form. That is using the minimum number of points or "vertices" that define the line. For example, when a straight line is formed, the critical information is the location of the end points of the line. As long as the location of the end points are know, a straight line can be readily drawn therebetween. Thus, the straight line needs two vertices. Similarly, a triangle can be formed with only the knowledge of the location of its three corners. Other polygons can similarly be recognized by knowing the location of their corner points, as well as the identity of their neighboring corners. Similarly, arcs, ovals, circles and other standard geometric shapes can be identified through the use of vertices. Therefore, when such graphical item are stored, the information that is really stored is the location of its vertices. Accordingly, as is well known to those skilled in the art, various graphical editing operations, such as resizing, rotating and moving can be accomplished merely by conducting a simple mathematical transformation of the vertices and redrawing the revised graphic.

The graphics editor user interface of the described embodiment as seen by the user will be described initially. A graphic object can be drawn using the stylus 38 to draw a desired image using the described inking process. If desired, suitable recognition software can be used to straighten lines, round arcs etc. Alternatively, specific application programs can be used to generate graphics.

In order to edit a graphic that has already been drawn, the user must first select the object(s) (or portions thereof) that are to be edited. This selection process is often referred to as a "highlighting" process because the selected portion of the object is emphasized in some dramatic fashion such as reverse video, a shadow line, a bolder line, or a distinctive background. To make a selection, the user makes an appropriate highlighting gesture. One suitable highlighting gesture is to simply place the tip of the stylus 38 on the screen 42 and to hold it substantially stationary for a predetermined period of time ΔT. During the period of time ΔT, the stylus tip should not move more than a small distance ΔP. Of course, the values and can be varied widely to meet the needs of a particular application. However, by way of example, a typical value for ΔT is 0.25 seconds and a typical value for ΔP is 2 pixels. A variety of other suitable highlighting gestures are described in detail in Stephen P. Capps' copending application Ser. No. 07/888,741, filed May 26, 1992 and entitled "Method for Selecting Objects on a Computer Display" which is assigned to the assignee of the present invention and which is incorporated herein by reference in its entirety.

Figure 3A:
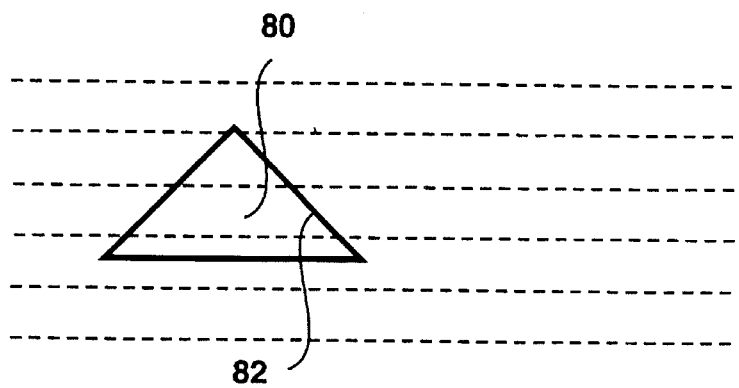
FIG. 3(a) illustrates a portion of the screen display shown in FIG. 2 with a triangular graphical object displayed thereon.
Figure 3B:
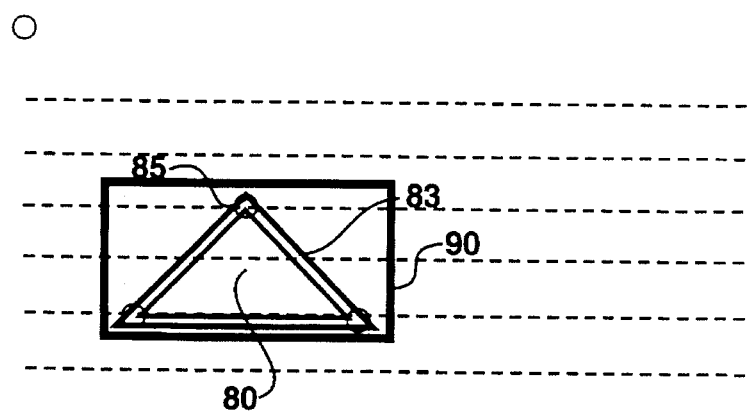
FIG. 3(b) illustrates the portion of the screen display shown in FIG. 3(a) with the triangular graphical object highlighted and a bounding box displayed about thereabout.
Figure 3C:
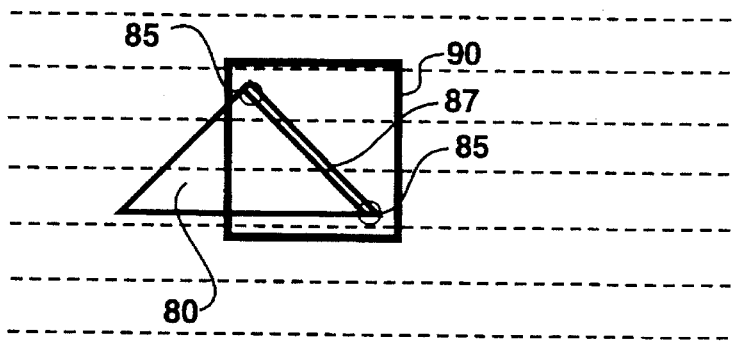
FIG. 3(c) illustrates the portion of the screen display shown in FIG. 3(a) with one segment of the triangular graphical object highlighted and a bounding box displayed about the highlighted segment of the graphical object.

Referring next to FIGS. 3a–3c, the appearance of a selected object will be described. FIG. 3a shows a graphic image that takes the form of a triangle 80. When an entire object is selected, such as the entire triangle 80 shown in FIG. 3b, all of the lines that are part of the selected object are highlighted. In the example shown, enlarged doubled lines 83 are displayed in place of the ordinary lines 82 of the object 80. Further circular "handles" 85 are drawn at the end of each line segment that makes up the object 80. Such "handles" can be provided at strategic locations on curved lines such as ovals and arcs as well. Additionally, a lightly shaded rectangular bounding box 90 is drawn about the selected object(s) 80.

As seen in FIG. 3c, a similar display is formed when only a portion of an object is selected. More specifically, only the selected portion 87 of the object is highlighted, the handles 85 are only provided at the ends of the selected lines and the bounding box 90 is formed only about the selected portion of the object 80.

As seen in FIGS. 3b and 3c, the lightly shaded lines that form the bounding box, as well as the highlighted double lines 83 are relatively wide. Similarly, the handles 85 are relatively large in diameter. The reason for this is so that the user can easily select these features merely by placing the stylus on the screen over the displayed position of the respective features. Thus, for example, the bounding box may be selected by touching the stylus to any portion of the wide bounding box lines. A highlighted line may be selected by touching the stylus against either of the double lines, or to the region therebetween. The handle may be selected by touching the stylus anywhere within the enlarged circles. If desired, the system can be arranged to provide a margin of error around any one of or all of these features. That is, if the stylus is placed within a predetermined small distance of a particular feature, the system can treat the operation as if it were actually placed on the feature.

Of course, the nature of the feature displays can be varied widely. For example, the handles may be square, triangular or of any other suitable geometric shape. The highlighting of the selected lines and the nature of the lines that form the bounding box can take any form, so long as they sufficiently distinguish themselves from the surroundings.

Figure 3D:
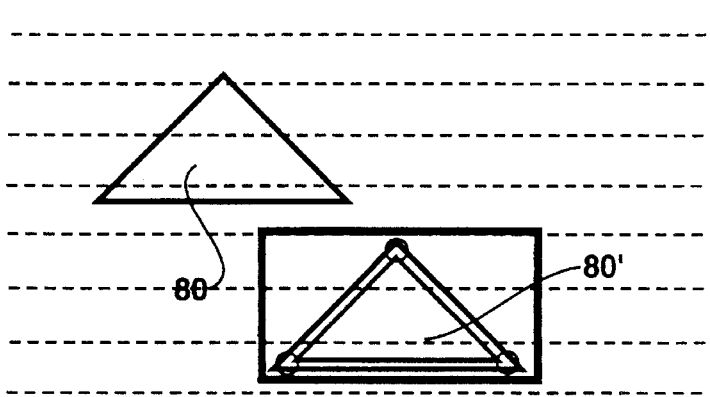
FIG. 3(d) illustrates the portion of the screen display shown in FIG. 3(b) after the triangular graphical object has been duplicated.
Figure 3E:
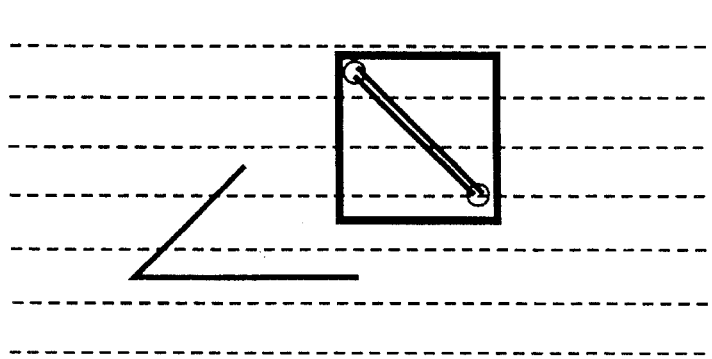
FIG. 3(e) illustrates the portion of the screen display shown in FIG. 3(c) after the highlighted portion of the original triangle has been moved.

Once an object is selected, it can be edited. In order to duplicate a selected item (which may be either an entire object or the selected portions of an object), the user merely taps the selected item with the stylus. The selected item is then duplicated and displayed a short distance from the original. The duplicate item is displayed in highlighted form with a bounding box being formed thereabout. By way of example, FIG. 3(d) illustrates the screen display that would occur when the triangle shaped object 80 shown in FIG. 3(b) is duplicated. As seen therein, the screen 42 now displays both the original triangle 80 and its highlighted duplicate 80'.

In order to resize an object both horizontally (the X direction) and vertically (the Y direction), the user selects the items they wish to resize and then places the tip of the stylus 38 on a corner of the resulting bounding box 90. This corner may then be dragged outward to enlarge the selected item(s) and dragged inward to reduce the selected item(s). During the bounding box dragging operation, the diagonally opposite corner of the bounding box will remain fixed as an "anchor," but the other three corners of the box are movable such that the rectangular bounding box enlarges and reduces in accordance with the movements of the stylus. That is, the bounding box will always be a rectangle that includes the stylus position and the fixed anchor position as two of its diagonal corners. The selected item(s) within the bounding box is then enlarged (or reduced) by an amount that corresponds to the proportional enlargement (reduction) of the bounding box 90.

If the user wishes to enlarge or reduce the selected object in just one direction, then the stylus is placed on a side of the bounding box 90, at a location that is spaced apart from any of the bounding box corners. The side that the stylus is placed on will then move back and forth with movements of the stylus, while the opposite side will remain fixed. The selected item(s) are enlarged (reduced) proportionally with the movements of the side being "dragged" by the stylus. By way of example, if the stylus is place on the top side of the bounding box 90, then the bottom side of the bounding box will remain fixed. Upward movements of the stylus will enlarge the bounding box in the Y direction and enlarge the selected item(s) proportionally in accordance with the enlargement of the bounding box. Similarly, downward movements of the stylus will reduce the bounding box in the Y direction and reduce the selected item(s) proportionally. Movements of the stylus in the lateral (left or right) direction will be ignored.

In order to move an object, the user places the tip of the stylus on an area that is within the bounding box, but not directly over the selected item. When this is done, the entire object will be moved in accordance with movements of the stylus, regardless of whether the entire object or only a portion thereof is selected. In order to move a selected portion of an object, the stylus is placed on the screen directly over a selected portion, but away from the handles 85. When this is done, movements of the selected portions will be made independent of any unselected portions of the object. Thus, it is entirely possible that the object can be broken apart as seen in FIG. 3(*e*).

In order to distort the appearance of an object, the stylus is placed on one of the handles 85 and moved. That handle will then move about with the stylus while the remaining handles will remain fixed in position. When this is done, the elements (lines) that are connected to the chosen handle will be stretch, rotated, compressed or otherwise distorted with the movements of the chosen handle.

Figure 4:
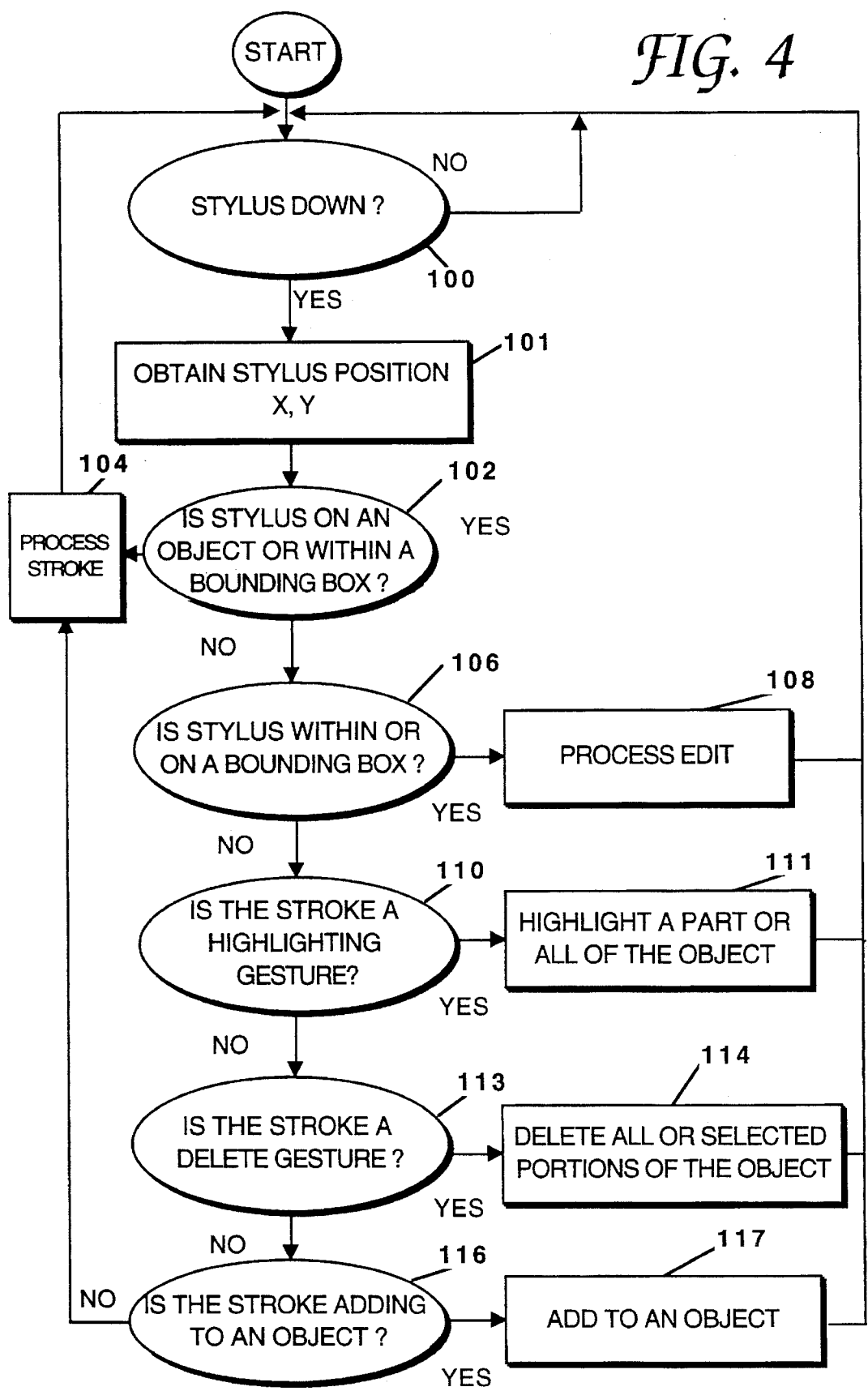
FIG. 4 is a flow diagram illustrating a method of editing a graphical object in accordance with the present invention.

Referring next to FIGS. 4–12, a method of processing inputs for a graphical editor in accordance with the present invention will be described. Turning first to FIG. 4, the process starts and then in step 100 the CPU 12 checks to determine whether the stylus 38 is in contact with the screen 42. If not, it waits for the stylus to be placed on the screen. When the stylus is placed on the screen, the CPU moves to step 101 where it obtains the current position (X,Y) of the stylus in cartesian coordinates. Thereafter, in step 102 the CPU determines whether the stylus has been placed either on a displayed object or within a bounding box 90. If not, the graphical editor of the present invention is not used and the logic moves to step 104 where the stroke is interpreted and processed in accordance with the requirements of the current application software and/or operating system.

If the stylus is positioned either on an object or within a bounding box 90 in step 102, then the logic moves to step 106 where the CPU determines whether the stylus is within or on a bounding box 90. That is, whether it is on an editable object. If the stylus is positioned within or on a bounding box, the stroke is assumed to be an editing gesture and the edit is processed in step 108 as will be described in more detail below with reference to FIG. 5. If the stylus is not on an editable object, the CPU moves to step 110 where it determines whether the stroke is a "highlighting" gesture. If so, the logic moves to step 111 where a selection or "highlighting" operation is executed. A suitable method accomplishing this "highlighting" operation is described in detail in Stephen P. Capps' copending application entitled "Method for Selecting Objects on a Computer Display" which is cited above. When an item or object is highlighted, the location of all of the vertices used to define the item or object are stored. Additionally, an indication of the total number of vertices in the selected items is stored as the value "#points," while the total number of vertices associated with the entire object(s) which include the selected items is stored as the value "Npoints".

If the stroke is not a highlighting gesture, then the logic moves to step 113 where the CPU determines whether the stroke is a delete gesture. If so, the delete gesture is processed in step 114. A variety of gestures can be used as a delete gesture. By way of example, if a wavy line drawn directly over an item can be treated as a delete gesture. Other suitable delete gestures will be apparent to those skilled in the art.

If the stroke is not a delete gesture, then the logic moves to step 116 where the CPU determines whether the stroke is adding to an object. If so, the stroke is processed in step 117. If the stroke is not recognized as an attempt to add to an object then the logic moves to step 104 where the stroke is processed. After any one of the processing steps 104, 108, 111, 114 and 117 is completed, the logic returns to step 100 to wait for the next user action and the described process is repeated.

Figure 5:
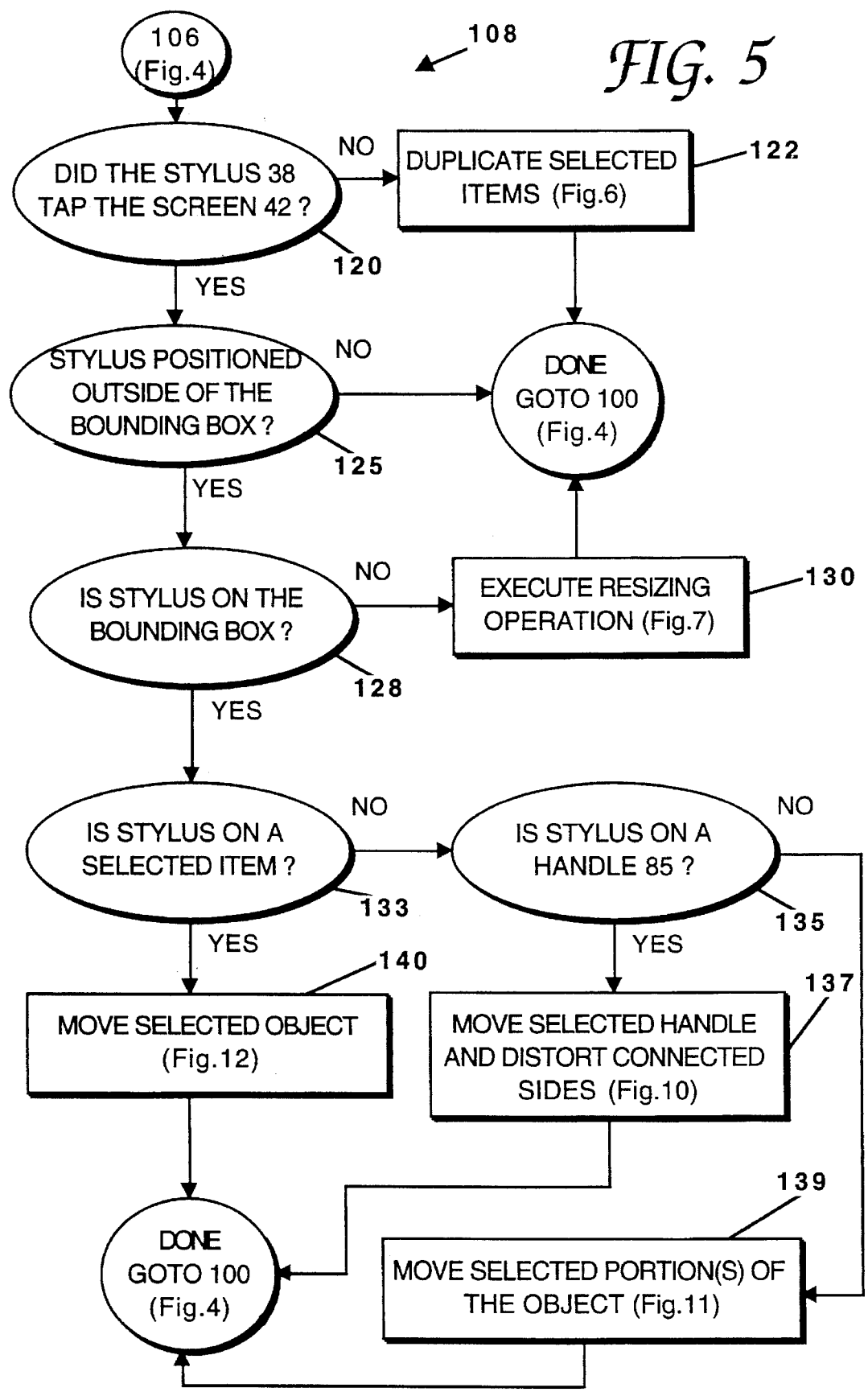
FIG. 5 is a flow diagram illustrating a method of processing edit commands in a manner that supports a graphical editor user interface in accordance with the present invention.

Referring next to FIG. 5, the edit processing step 108 will be described in more detail. Initially, it should be appreciated that step 108 will only be entered when there is a highlighted graphic item. Additionally, there will always be a bounding box 90 displayed since a bounding box is displayed whenever a graphic item is highlighted. The edit processing begins in step 120 where the CPU determines whether the user has entered a duplicating gesture. A variety of gestures can be used to indicate a duplicating operation. In the described embodiment, a tapping gesture is used to indicate a duplication operation. Alternative gestures might take the form of pressing a "duplicate" button displayed on the screen or writing a symbol (such as a "D" for duplicate or a "C" for copy) directly over the selected items.

In the described embodiment, a duplicate operation is performed when the stylus 38 is tapped against the screen. A tap is defined as touching the screen 42 with the stylus 38 and then lifting the stylus from the screen within a predetermined amount of time and without moving the stylus by more than a predetermined inconsequential distance. A suitable value for the predetermined maximum amount of time is in the range of one twentieth of a second to one second, with one sixth of a second being an a suitable value for most people. A suitable value for the predetermined maximum stylus movement is in the vicinity of 0.025 inches or two (2) pixels.

If the CPU detects that the user has tapped the screen 42, then the highlighted item(s) is (are) duplicated in step 122. When a highlighted item is duplicated, its duplicate is placed a small distance from the original object, the highlighting is removed from the original item and the newly displayed duplicate is highlighted as seen in FIG. 3(*d*) and as will be described in more detail below with reference to FIG. 6. It is noted that edit processing step 108 is only entered when a displayed graphical item is selected. Therefore, where the logic reaches step 122, there should always be a highlighted item to duplicate. After the highlighted item is duplicated and the duplicate displayed, the logic returns to step 100 where it waits for the next user input to process.

If the CPU determines in step 120 that the user's action is not a tap, then in step 125 it determines whether the stylus is outside the bounding box 90. If so, a mistake has been made and it is assumed that edit processing is not the desired action. Accordingly, the editing process is terminated and the logic returns to step 100 to process the next stroke. Assuming the stylus is not outside the bounding box 90, the logic moves to step 128 where it determines whether the stylus is on the bounding box 90. If so, the desired action is assumed to be a resizing operation and the highlighted contents of the bounding box are resized in accordance with the movement of the stylus in step 130 as described below with reference to FIG. 7

If the stylus is not on the bounding box 90, then in step 133 the logic determines whether the stylus is on a selected item. If so, the logic moves to step 135 where it determines whether the stylus is on a handle 85. The handles 85 are positioned at the vertices of the highlighted items. If the stylus is on a handle, then in step 137 the selected handle is moved with the stylus and each side of the object that is attached to the moving vertice (handle) is distorted together with its connecting points (if any). The remaining handles remain fixed in position. The method by which this distortion occurs will be described in more detail below with reference to FIG. 10.

When the stylus is on a selected item, but is not on a handle 85, then the highlighted item(s) are moved together with the stylus in step 139. The selected item moving step will be described in more detail below with reference to FIG. 11.

If in step 133 the CPU 12 determines that the stylus is not on a selected item, then it is assumed that the stylus is positioned within the bounding box 90 but is not on a selected item. Therefore, in step 140, movements of the stylus are treated as instructions to move the object(s) that contain highlighted items by an amount, and in a direction that corresponds to the movements of the stylus itself over the screen 42. This process is described in more detail below with respect to FIG. 12.

After the completion of any one of the duplication step 122, the resizing step 130, the distortion step 137, the selected item moving step 139 or the whole object moving step 140, the editing step is terminated and the logic returns to step 100 (FIG. 4) where it awaits the next user action.

Figure 6:
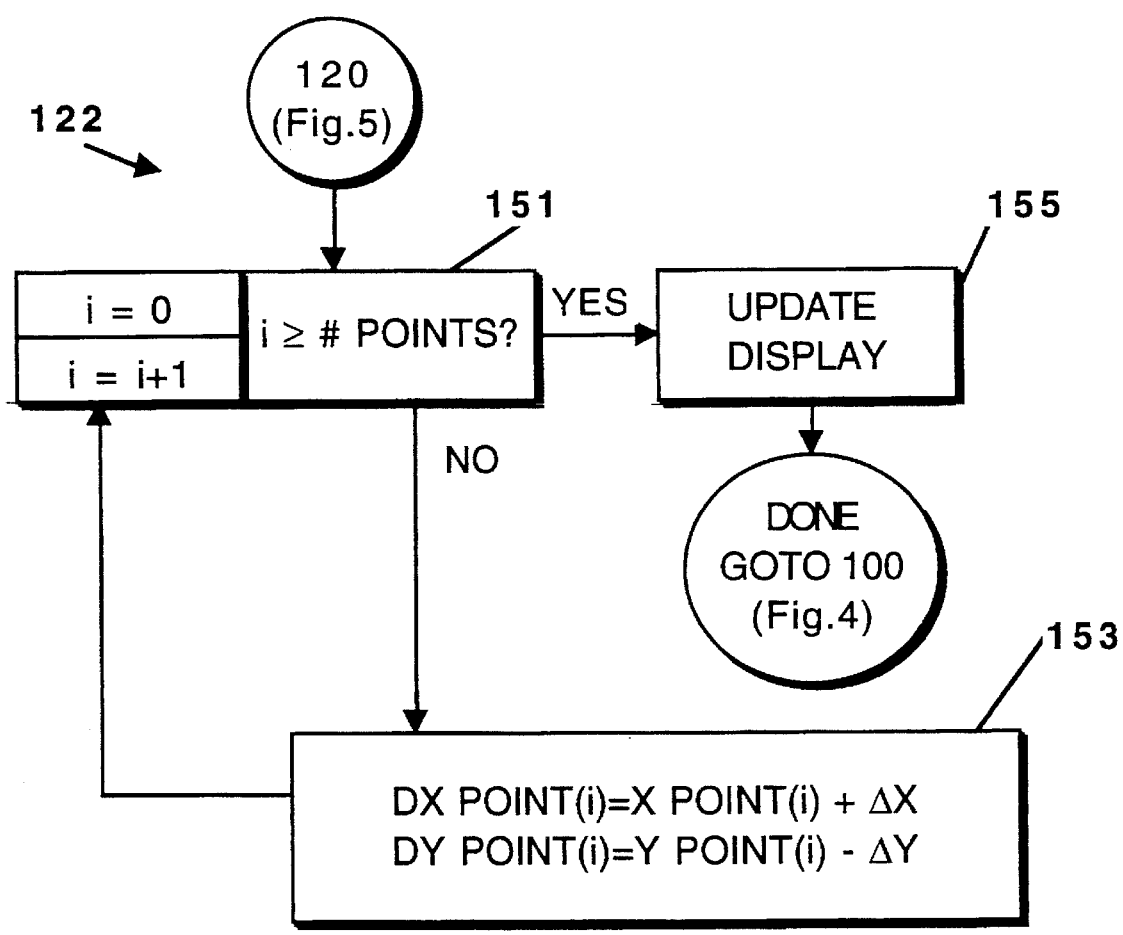
FIG. 6 is a flow diagram illustrating a method of duplicating an object.

Referring next to FIG. 6, the duplication operation of step 122 (from FIG. 5) will be described in more detail. Initially, a copy of the highlighted item(s) is made. Thus, if an entire object is highlighted, a copy of the entire object is made. That is, a duplicate listing of all of the vertices required to define the entire object is made. On the other hand, if only a portion of an object is highlighted, then only the highlighted portions of the object will be copied. That is, the duplicate listing will only contain the vertices required to define the selected portions. After the duplicate listing has been made, a preselected value $\Delta X$, $\Delta Y$ is added to the coordinates of each vertice in the duplicate listing. This serves to offset the duplicate from the original. By way of example a suitable $\Delta X$ is +¼ inch (20 pixels) (i.e. ¼ inch to the right) and a suitable $\Delta Y$ is -¼ inch (i.e. ¼ inch down).

More specifically, the duplicating and offsetting steps are accomplished in a single loop which is started at step 151. Initially, the value of a counter "i" is set to zero. Then the value of "i" is compared to the value of the variable "#points", which indicates the number of vertices used to define the selected item(s). As long as the value of counter "i" is not greater than or equal to the value of variable "#points", the logic continues to step 153 where the coordinates of the duplicate point "DXPoint(i), DYPoint(i)" are set equal to the corresponding coordinates of the original point "XPoint(i), YPoint(i)" plus the offset. Thus:

DXPoint(i)=XPoint(i)+$\Delta X$

DYPoint(i)=YPoint(i)-$\Delta Y$

Thereafter, the logic loops back to step 151 where the counter "i" is incremented and again compared to the value of variable "#points". So long as the value of the counter is less than the value of variable "#points", the logic will return to step 153 where the location of the next duplicate point will be calculated. However, when the value of the counter "i" becomes greater than or equal to the value of variable "#points", the logic moves to display updating step 155 where the duplicate image is added to the screen display and highlighted. At the same time, the highlighting of the original image is eliminated. After the display is updated, the logic returns to step 100 to await the next user input.

Figure 7:
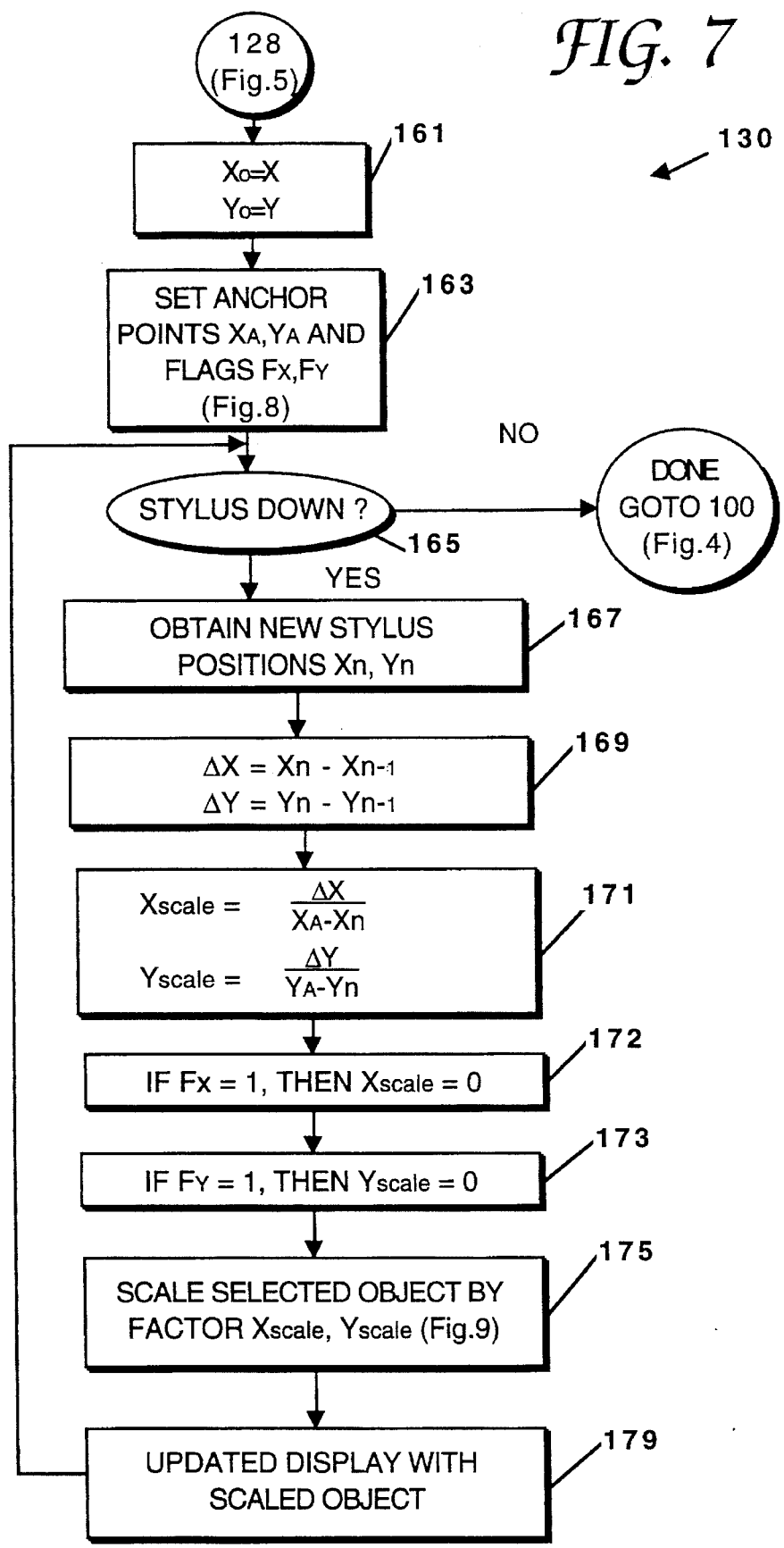
FIG. 7 is a flow diagram illustrating a method of resizing an object.

Referring next to FIG. 7, the resizing step 130 will be described more fully. As indicated above, resizing will occur when the stylus is initially placed on the bounding box 90 and then dragged across the screen 42. If the stylus is initially placed on a corner of the bounding box, then the resizing will occur in two dimensions. On the other hand, if the stylus is initially place on a side of the bounding box, then the resizing will occur in one dimension only.

The resizing process begins in step 161 where the values $X_0$ and $Y_0$ are set to the original coordinates at which the stylus 38 was placed on the display screen 42. Then, in step 163 the location ($X_A$, $Y_A$) of an anchor A is determined. If the stylus 38 is positioned on a corner of the bounding box 90, then the anchor is selected to be the corner that is diagonally across from the stylus position. On the other hand, if the stylus 38 is positioned on a side of the bounding box 90, then the anchor is chosen as the position of the opposite side of the box. For example, if the top side is chosen, then the bottom side becomes the anchor. If the left side is chosen, then the right side becomes the anchor, and so forth. Since stretching will only occur in one dimension when a side is chosen, movements in a direction parallel to the chosen side will be ignored. That is, if the top side is chosen, then value $Y_A$ is set to the vertical position of bottom line of the bounding box 90. At the same time, the value $X_A$ is not important and is effectively ignored. This is accomplished by setting a flag $F_x$. Similarly, if the right hand side of the bounding box 90 is chosen, then the value $X_A$ is set to the horizontal position of the left side of the bounding box while the value $Y_A$ is effectively ignored (i.e. a flag $F_y$ is set). On the other hand, if the stylus 38 is positioned at the top left corner of the bounding box 90, then the anchor position $X_A$, $Y_A$ is set equal to the coordinates of the bottom right hand corner of the bounding box.

After the anchor position has been set, the process moves to step 165 where it determines whether the stylus has been lifted from the screen. If so, the resizing operation is terminated and the logic goes back to step 100 where it waits to process the next user input. When the stylus remains on the screen 42, the CPU 12 obtains the new coordinates $X_n$, $Y_n$ of the stylus 38 in step 167. Thereafter, in step 169 the distance that the stylus has moved ($\Delta X$, $\Delta Y$) since that last time the stylus position was polled is calculated. Thus, $\Delta X = X_n - X_{n-1}$ and $\Delta Y = Y_n - Y_{n-1}$.

After the distance the stylus has been moved has been calculated, the scaling factors in both the vertical and horizontal directions are calculated in step 171. Scaling is done on a proportional basis, with the scaling in the horizontal direction being proportional to the amount of movement in the horizontal direction and the scaling in the vertical direction being proportional to the amount of movement in the vertical direction. More specifically, the scaling coefficient in the horizontal direction $X_{scale}$ and the scaling coefficient in the vertical direction $Y_{scale}$ are calculated using the formulas:

$X_{scale} = \Delta X / (X_A - X_n)$;

$Y_{scale} = \Delta Y / (Y_A - Y_n)$.

After the scaling coefficients $X_{scale}$ and $Y_{scale}$ have been calculated, the CPU moves to step 172 where it determines whether the flag $F_x$ has been set. If so, the value $X_{scale}$ is set to zero (0). Thereafter, in step 173 the CPU determines whether the flag $F_y$ has been set. If so, the value $Y_{scale}$ is set to zero (0). Steps 172 and 173 serve to disable the scaling in one dimension if a side of the bounding box was initially "grabbed" rather than a corner.

After the final scaling coefficients have been determined, the logic moves to step 175 where objects are scaled by the factors $X_{scale}$ and $Y_{scale}$ with respect to the anchor position. The actual scaling routine involves scaling the positions of the vertices and will be described in more detail below with respect to FIG. 9. After the locations of the scaled vertices have been calculated, the display is updated in step 179 and the logic returns to step 165 to determine whether the user has lifted the stylus from the screen 42. If so, the scaling routine is terminated and the logic returns to step 100 (FIG. 4) to wait for the next user action. If not, the scaling routine is continued until the user quits the routine by lifting the stylus from the screen.

Figure 8:
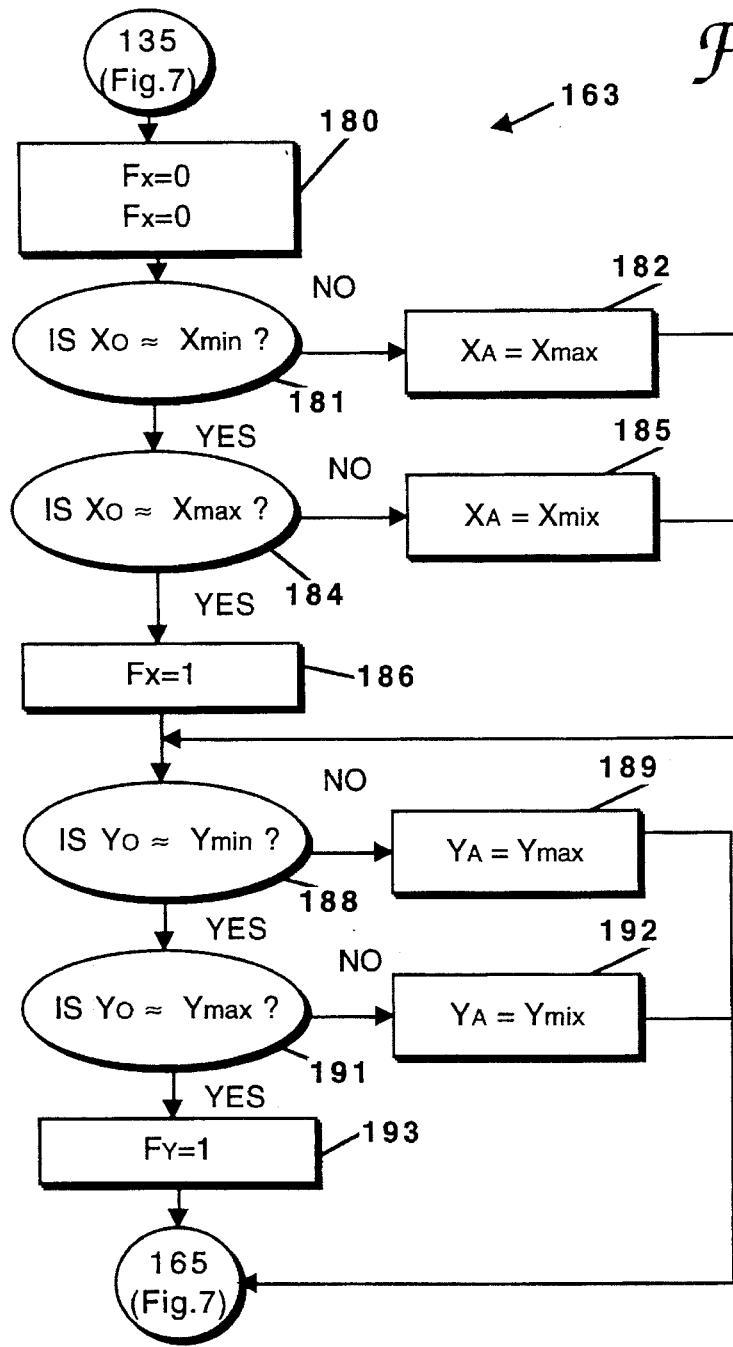
FIG. 8 is a flow diagram illustrating a method of setting an anchor position to support the resizing process set forth in FIG. 7.

Referring next to FIG. 8, anchor setting step 163 will be described in somewhat more detail. Initially, in step 180, the flags $F_x$ and $F_y$ are set to zero. Then, in step 181, the CPU determines whether the stylus is on the left hand side of the bounding box. This is accomplished by determining whether the horizontal position of the stylus X is within a predetermined range of a value $X_{min}$. The value $X_{min}$ represents the horizontal location of the left side of the bounding box. When the bounding box is displayed as a wide strip as seen in FIGS. 3(b)–3(e), the predetermined range is preferably set to correspond to the displayed width of the bounding box borders. On the other hand if the displayed width of the bounding box is not sufficiently broad in a particular application, the permissible range may include points just outside the bounding box borders as well. If the horizontal location of the stylus is substantially equal to $X_{min}$, it is assumed that the stylus is intended to be somewhere along the left side of the bounding box, so the logic moves to step 182 where it sets the value $X_A$ equal to a value $X_{max}$. The value $X_{max}$ represents the horizontal location of the right side of the bounding box. Therefore, the anchor is set to the right side of the bounding box.

If the horizontal stylus position X is not substantially equivalent to $X_{min}$, then in step 184 the CPU determines whether the value X is substantially equal to the value $X_{max}$. If so, the value $X_A$ is set equal to $X_{min}$ in step 185. In this case, the stylus is considered to be on the right side of the bounding box and the anchor is set to the left side. If the value X is not substantially equal to the value $X_{max}$, then the flag $F_x$ is set to one (1) in step 186, which indicates that the stylus is not on either a the left or right side of the bounding box 90.

After any one of steps 182, 185 or 186 is completed, the CPU 12 moves to step 188 where it determines whether the vertical position of the stylus Y is substantially equal to the value $Y_{min}$. If so, the stylus 38 is considered to be on the bottom side of the bounding box and thus the logic moves to step 189 where the vertical component of the anchor location $Y_A$ is set to $Y_{max}$. On the other hand, if the vertical position of the stylus Y is not substantially equal to the value $Y_{min}$, the logic moves to step 191 where it determines whether the value Y is substantially equal to $Y_{max}$. If so, the vertical anchor position is set to $Y_{min}$ in step 192. If not, it is determined that the stylus is not on either the top or bottom side of the bounding box and the flag $F_y$ is set to zero in step 193. When any one of steps 189, 192, or 193 has been completed, the anchor setting task is completed and the logic moves on to step 165 as previously described with respect to FIG. 7.

It is noted that if either of the flags $F_x$ or $F_y$ are set, then the stylus is not on a corner of the bounding box. On the other hand, if neither flag is set, then the stylus is on a corner of the bounding box. When the stylus is on a corner of the bounding box, the values of both $X_A$ and $Y_A$ are set to the opposing sides, which amounts to the diagonally opposite corner of the bounding box. When this occurs, neither of the flags $F_x$ or $F_y$ are set so that scaling will occur in both the horizontal and vertical directions. On the other hand, if the stylus is only on either the left or the right side of the bounding box 90, the flag $F_y$ will be set so that scaling will not occur in the vertical direction. In this event, scaling will only occur in the horizontal direction. Similarly, if the stylus is placed only on either the top or bottom side of the bounding box 90, the flag $F_x$ will be set so that scaling will not occur in the horizontal direction. In this event, scaling would only occur in the vertical direction.

Figure 9:
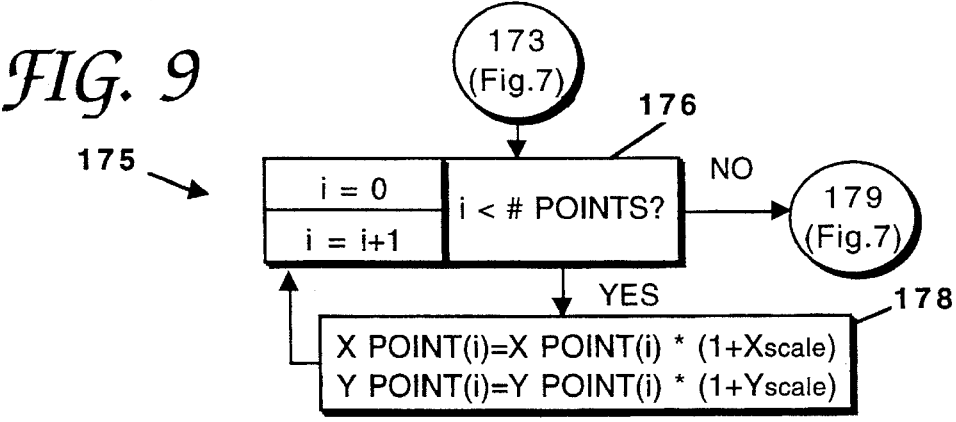
FIG. 9 is a flow diagram illustrating a method of scaling an object to support the resizing process set forth in FIG. 7.

Referring next to FIG. 9, the actual scaling algorithm that is used in step 175 will be described. Essentially, a loop is created that involves steps 176 and 178. Initially, the counter "i" is set to zero (0). Then, in step 176 the CPU checks to determine whether the value "i" is greater than or equal to the number of vertices "#points" that are used to define the selected item(s) within the bounding box. As long as the value of counter "i" does not exceed the value of variable "#points", the CPU moves to step 178 where the actual scaling occurs. Then the horizontal position of vertice (i) is scaled by the factor $X_{scale}$ relative to the anchor position $A_x$. Thus, the X coordinate "XPoint(i)" for vertice "i" is scaled using the following equation:

$$XPoint(i)=XPoint(i) * (1+X_{scale}).$$

Similarly, the Y coordinate "YPoint(i)" for vertice "i" is scaled using the equation:

$$YPoint(i)=YPoint(i) * (1+Y_{scale}).$$

After these multiplications have been completed, the CPU returns to step 176 where the counter "i" is incremented and again compared to the value "#points". As long as the value of counter "i" remains below the value of variable "#points" the loop will continue. On the other hand, when the value of counter "i" reaches the value of variable "#points", the scaling operation is completed and the screen display is updated in step 179 to show the scaled item(s) as discussed above with respect to FIG. 7.

Figure 10:
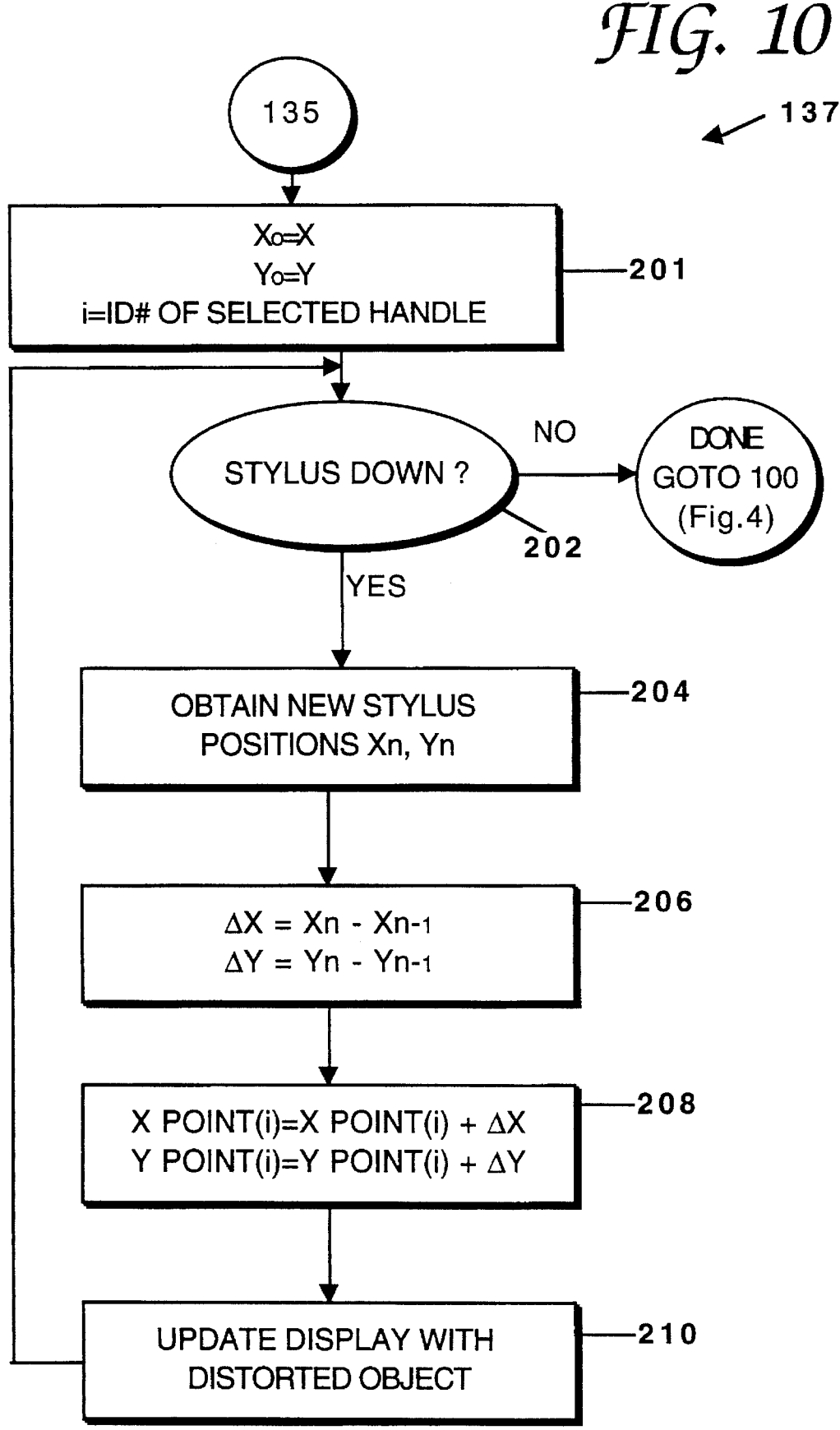
FIG. 10 is a flow diagram illustrating a method of distorting an object.

Turning next to FIG. 10, the method of distorting an object suitable for use in step 137 (FIG. 5) will be described in more detail. Initially, it should be appreciated that distorting an object involves moving one of the vertices of an object while the remaining vertices remain fixed. Thus, the lines that are connected to the moving vertice (handle 85) are typically, stretched, rotated, compressed or otherwise distorted.

The distortion process begins at step 201 where the initial position of the stylus is recorded. That is, $X_0=X$ and $Y_0=Y$. Additionally, the value "i" is set equal to the identification number of the selected handle. After the initial position is recorded, the CPU moves to step 202 where it determines whether the stylus 38 has been lifted from the screen 42. If so, the distortion process is completed and the logic returns to step 100 to wait for the next user action. When the stylus remains on the screen 42, the logic moves to step 204 where the new stylus position $(X_n, Y_n)$ is obtained. Thereafter, in step 206 the distance that the stylus has moved ($\Delta X, \Delta Y$) is calculated. That is, $\Delta X = X_n - X_{n-1}$ and $\Delta Y = Y_n - Y_{n-1}$.

Once the stylus' change in position has been calculated, the new position of the selected handle is calculated in step 208 and the updated image of the distorted graphic item is displayed on screen 42 (step 210) to give the user immediate feedback as to the appearance of the distorted graphic. The position of the selected handle [XPoint(i), YPoint(i)] is calculated (step 208) by adding the change in stylus position to the old position of the selected handle. That is:

XPoint(i)=XPoint(i)+ΔX

YPoint(i)=YPoint(i)+ΔY

After the updated image of the distorted graphic is displayed in step 210, the logic returns to step 202 where it again checks to determine whether the stylus 38 has been lifted from the screen 42. If not, the described steps 202–210 are repeated until the stylus is lifted. When the stylus is lifted, the distortion process terminates and the CPU returns to step 100 to wait for the next user action.

Figure 11:
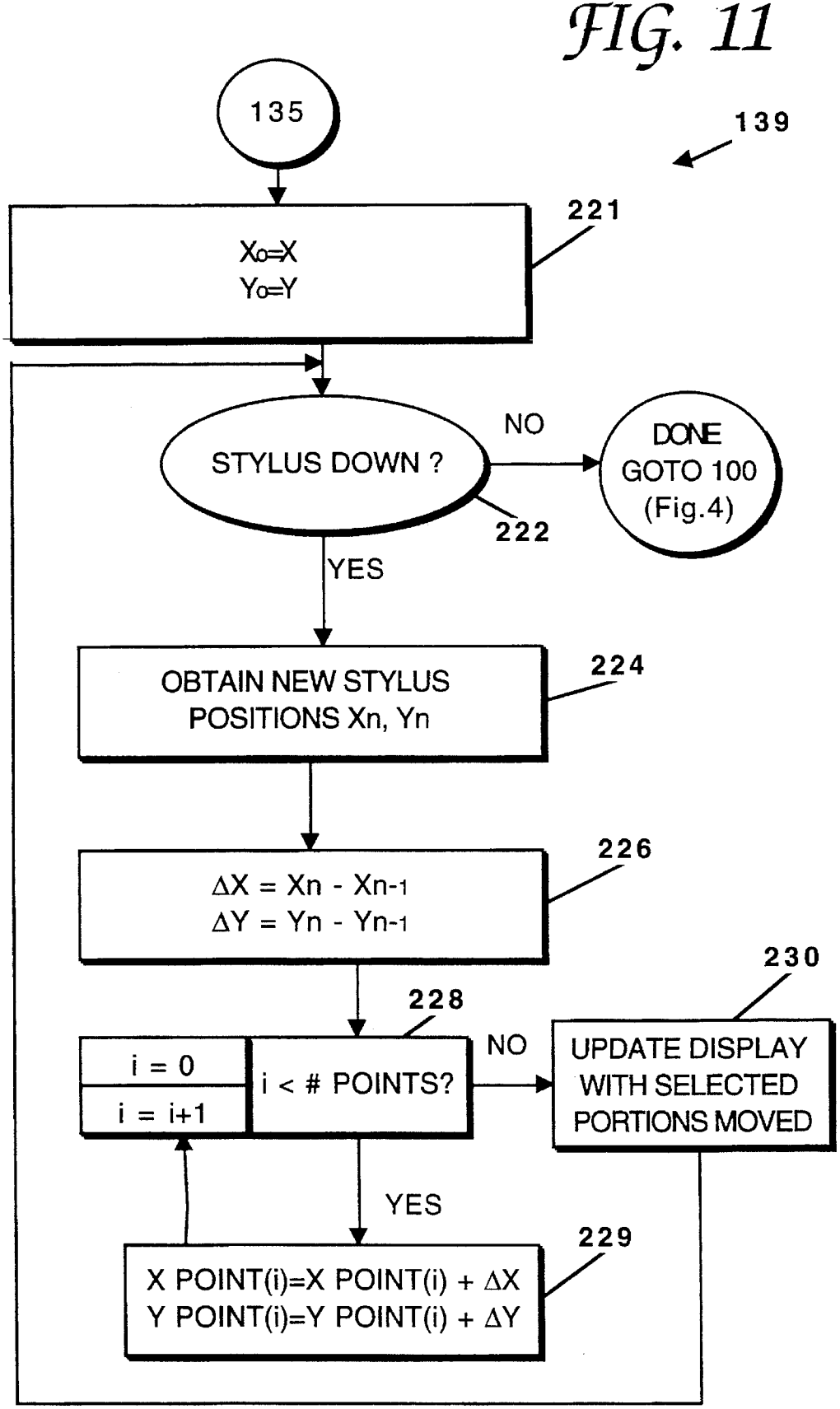
FIG. 11 is a flow diagram illustrating a method of moving selected portions of an object.

Referring next to FIG. 11, the method of moving a selected portion of an object as set forth in step 139 will be described in more detail. Initially, it should be appreciated that moving a selected portion of an object involves moving all of the vertices associated with the selected portion of the object while the unselected vertices remain fixed. Thus, the connection(s) between the selected (moving) portions of the object to the unselected (fixed) portions of the object may very well be severed.

The moving selected parts process begins at step 221 where the initial position of the stylus are determined. That is, $X_0=X$ and $Y_0=Y$. After the initial position is determined, the CPU moves to step 222 where it determines whether the stylus 38 has been lifted from the screen 42. If so, the selected parts moving process is completed and the logic returns to step 100 to wait for the next user action. When the stylus remains on the screen 42, the logic moves to step 224 where the new stylus position $(X_n, Y_n)$ is obtained. Thereafter, in step 226 the distance that the stylus has moved ($\Delta X$, $\Delta Y$) is calculated. That is, $\Delta X=X_n-X_{n-1}$ and $\Delta Y=Y_n-Y_{n-1}$.

Once the stylus' change in position has been calculated, the new position of the selected vertices are calculated in the loop created by steps 228 and 229. Initially, in step 228, the loop is initiated and a counter "i" is set to zero (0). Then, the value in counter "i" is compared to the value of variable "#points", which represents the number of vertices that are associated with the selected items. As long as the value of variable "#points" is greater than or equal to the current value of counter "i", the loop continues to step 229 where the position of the selected vertice XPoint(i), YPoint(i) is calculated. This is accomplished by adding the change in stylus position to the old position of the vertice (i). That is:

XPoint(i)=XPoint(i)+ΔX

YPoint(i)=YPoint(i)+ΔY

After the updated position of vertice (i) is calculated, the logic loops back to step 228 where the counter "i" is incremented by one and then compared to the value of variable "#points". So long as the value of counter "i" is less than the value "#points", the loop 228, 229 will be continued until the position of each of the selected vertices has been updated. When all of the selected vertices have been updated, the value in counter "i" will equal the value of variable "#points" and the loop is terminated.

When the loop is terminated, the updated image of the graphic item is displayed on screen 42 (step 230) to give the user immediate feedback as to the appearance of the graphic after the selected items have been moved. After the updated image of the distorted graphic is displayed in step 230, the logic returns to step 222 where it again checks to determine whether the stylus 38 has been lifted from the screen 42. If not, the described steps 222–230 are repeated until the stylus is lifted. When the stylus is lifted, the selected item move process terminates and the CPU returns to step 100 to wait for the next user action.

Figure 12:
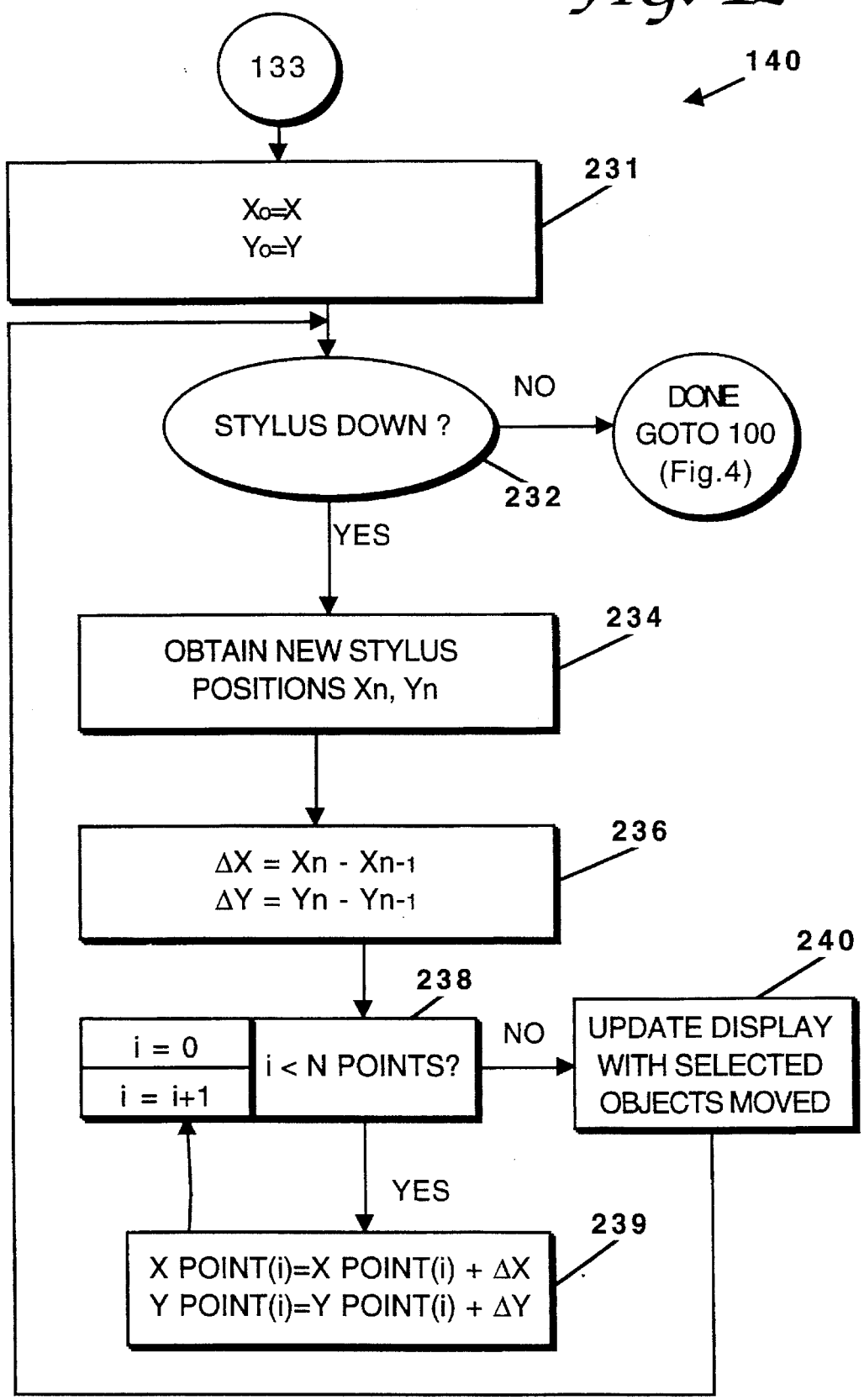
FIG. 12 is a flow diagram illustrating a method of moving an object.

Referring next to FIG. 12, the method of moving an object positioned within a bounding box 90 as set forth in step 140 will be described in more detail. Initially, it should be appreciated that moving an object involves moving all of the vertices associated with the selected object. Thus, the algorithm used to accomplish a full object move is very similar to the algorithm described above that is used in the selected parts moving process.

The object moving process begins at step 231 where the initial position of the stylus is determined. That is, $X_0=X$ and $Y_0=Y$. After the initial position is determined, the CPU moves to step 232 where it determines whether the stylus 38 has been lifted from the screen 42. If so, the moving process is completed and the logic returns to step 100 to wait for the next user action. When the stylus remains on the screen 42, the logic moves to step 234 where the new stylus position $(X_n, Y_n)$ is obtained. Thereafter, in step 236 the distance that the stylus has moved ($\Delta X$, $\Delta Y$) is calculated. That is, $\Delta X=X_n-X_{n-1}$ and $\Delta Y=Y_n-Y_{n-1}$.

Once the stylus' change in position has been calculated, the new positions of the vertices of the object(s) to be moved are calculated in the loop created by steps 238 and 239. Initially, in step 238, the loop is initiated and a counter "i" is set to zero (0). Then, the value in counter "i" is compared to the value of variable "Npoints", which represents the number of vertices that are associated with the object(s) to be moved. Note that "Npoints" may be somewhat different than "#points" if the entire object is not selected. That is because "#points" is used to signify the number of vertices associated with the selected items.

As long as the value "Npoints" is greater than or equal to the current value of counter "i", the loop continues to step 239 where the position of the vertice "i" [XPoint(i), YPoint(i)] is calculated. This is accomplished by adding the change in stylus position to the old position of the vertice. That is:

XPoint(i)=XPoint(i)+ΔX

YPoint(i)=YPoint(i)+ΔY

After the updated position of vertice "i" is calculated, the logic loops back to step 238 where the counter "i" is incremented by one and then again compared to the value "Npoints". So long as the value of counter "i" is less than the value "Npoints", the loop 238, 239 will be continued until the position of each of the vertices associated with the objects to be moved has been updated. When all of the vertice positions have been updated, then the value in counter "i" is equal to "Npoints" and the loop is terminated.

When the loop is terminated, the updated image of the graphic item is displayed on screen 42 (step 240) to give the user immediate feedback as to the appearance of the graphic after the selected objects have been moved. After the updated image of the graphic is displayed in step 240, the logic returns to step 232 where it again checks to determine whether the stylus 38 has been lifted from the screen 42. If not, the described steps 232–240 are repeated until the stylus is lifted. When the stylus is lifted, the full object moving process terminates and the CPU returns to step 100 to wait for the next user action.

As will be appreciated by those skilled in the art, the object moving, the selected parts moving and distortion routines are very similar in nature. Accordingly, the programming may be simplified by using the same code to accomplish all three functions.

In an alternative embodiment, in order to assist the user in connecting graphics, the described vertices can optionally be treated as "gravity points". When either the stylus or a vertice of a moving object is positioned within a predefined range "ϵ" of a "gravity point", the CPU makes the assumption that the user is trying to position the stylus or vertice on the gravity point and the position of the stylus or moving vertice jumps to the gravity point. This makes it much easier for the user to quickly connect parts. The gravity point feature is preferably set up such that it may be activated and disabled by the user.

Although only a few embodiment of the present invention have been described in detail herein, it should be understood that the present invention may be embodied in many other specific forms without departing from the spirit or scope of the invention. For example, the computer system, on which the described graphics editor is implemented may be varied widely. Additionally, the nature of the highlighting, the appearance of the bounding box and the selection of the number of vertices that are used to define a line or other object may be widely varied in accordance with invention. Further, the algorithms described are exemplary in nature and may be widely varied within the scope of the invention. From the foregoing, it should be apparent that the present examples are to be considered as illustrative and not restrictive and the invention is not to be limited to the details given herein, but may be modified within the scope of the appended claims.

What is claimed is:

1. A method of editing objects displayed on a screen of a display assembly of a pen based computer system, the method comprising the steps of:

selecting a portion of an object to be edited, the selected portion of the object being displayed at an original location on the screen;

highlighting the selected portion of the object;

drawing a bounding box about the highlighted portion of the object; and editing the object wherein during the editing step a user is permitted to duplicate the selected portion of the object by tapping a stylus on the screen at a location that is within the bounding box, wherein no other actions by the user are required to facilitate the duplication;

wherein when a duplication of the selection portion of the object is made, a duplicate of the selected portion of the object is displayed at a position that is offset from the position of the original selected portion of the object in a display updating step.

2. A method of editing objects as recited in claim 1 wherein the duplicate is displayed in highlighted form and the original selected portion of the object is displayed in unhighlighted form during the display updating step.

3. A method of editing objects as recited in claim 1 wherein the highlighting step displays the selected portion as associated double lines, the double lines being a pair of non-intersecting lines substantially parallel to the selected portion and each other that are emboldened relative to an unhighlighted image line that is displayed for an unselected portion wherein placement of the stylus over either one of the double lines or at a position therebetween is considered placing the stylus over the selected portion.

4. A method of editing objects displayed on the screen of a display assembly of a stylus based computer system, the method comprising the steps of:

a) selecting a portion of an object to be edited;

b) highlighting the selected portion of the object;

c) providing editing handles at designated positions relative to the selected portion of the object;

d) drawing a bounding box about the selected portion of the object;

e) editing the object by movements of the stylus across the screen wherein a user is permitted to, resize the selected portion of the object during the editing step, wherein such resizing occurs when the user places the stylus on the perimeter of the bounding box and drags the stylus across the screen while the stylus is substantially in contact with the screen whereby the selected portion of the object is resized as a function of the movements of the stylus, move the object by placing the stylus within the bounding box at a location that is not substantially directly over either the bounding box or any selected portion of the object and dragging the stylus across the screen while the stylus is substantially in contact with the screen whereby the entire object is moved as a function of the movements of the stylus, duplicate the selected portion of the object by tapping the stylus on the screen at a location that is within the bounding box, wherein no other actions by the user are required to facilitate the duplication;

distort the object by placing the stylus on one of the editing handles and dragging the pointer across the screen while the stylus is substantially in contact with the screen whereby the object is distorted as a function of the movements of the stylus, and move the selected portion of the object independent of any nonselected portions of the object by placing the stylus on the selected portion of the object at a location that is not substantially directly over an editing handle and dragging the stylus across the screen while the stylus is substantially in contact with the screen whereby the selected portion of the object is moved as a function of the movements of the stylus, and f) updating the display to reflect any changes made during the editing step.

5. A method of editing objects as recited in claim 4 wherein the editing and updating the display steps are continually repeated until the stylus is lifted from the screen so as to provide the user with a visual depiction of the editing operation as it proceeds.

6. A method of editing objects as recited in claim 4 further comprising repeating the updating step during resizing, moving and distorting actions so as to provide the user with a visual depiction of the editing operation as it proceeds, and wherein:

the highlighting step displays the selected portion as associated double lines, the double lines being a pair of non-intersecting lines substantially parallel to the selected portion and each other that are emboldened relative to unhighlighted image lines that are displayed for the non-selected portions wherein placement of the stylus over either one of the double lines or at a position therebetween is considered placing the stylus over the selected portion.

* * * * *